(12) United States Patent
Barnsley

(10) Patent No.: US 8,475,128 B2
(45) Date of Patent: Jul. 2, 2013

(54) FAIRING FOR WIND TURBINE BLADE

(75) Inventor: Malcolm Barnsley, Bitterne Manor (GB)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 13/139,868

(22) PCT Filed: Dec. 14, 2009

(86) PCT No.: PCT/EP2009/067090
§ 371 (c)(1),
(2), (4) Date: Sep. 21, 2011

(87) PCT Pub. No.: WO2010/069926
PCT Pub. Date: Jun. 24, 2010

(65) Prior Publication Data
US 2012/0020798 A1    Jan. 26, 2012

Related U.S. Application Data

(60) Provisional application No. 61/138,183, filed on Dec. 17, 2008.

(30) Foreign Application Priority Data

Dec. 17, 2008   (DK) .................................. 2008 01794

(51) Int. Cl.
*F03D 11/00*   (2006.01)
(52) U.S. Cl.
USPC ............................ 416/61; 416/62; 416/146 R
(58) Field of Classification Search
USPC ................. 416/61, 62, 84, 194, 196 A, 146 R
See application file for complete search history.

(56) References Cited

U.S. PATENT DOCUMENTS

| 6,015,115 A | 1/2000 | Dorsett et al. |
| 2006/0037402 A1 | 2/2006 | Musial et al. |
| 2007/0056384 A1* | 3/2007 | Yung et al. ...................... 73/807 |

FOREIGN PATENT DOCUMENTS

| DE | 197 19 221 | | 10/1998 |
| JP | 4-164231 | | 6/1992 |
| JP | 2008057350 A | * | 3/2008 |
| WO | 2008/145727 | | 12/2008 |

OTHER PUBLICATIONS

Sven Nytoft Rasmussen; 1st Technical Examination and Search Report issued in priority Denmark Application No. PA 2008 01794; Jul. 16, 2009; 5 pages; Denmark Patent and Trademark Office.
Raffaele Di Renzo; International Search Report issued in priority International Application No. PCT/EP2009/067090; Oct. 19, 2010; 3 pages; European Patent Office.
Raffael Di Renzo; Written Opinion of International Searching Authority issued in priority International Application No. PCT/EP2009/067090; Oct. 19, 2010; 5 pages; European Patent Office.
Machine generated English translation of DK 19719221, 3 pages.

* cited by examiner

*Primary Examiner* — Edward Look
*Assistant Examiner* — Jesse Prager
(74) *Attorney, Agent, or Firm* — Wood, Herron & Evans, LLP

(57) ABSTRACT

The invention relates to a fairing adapted to be mounted on a wind turbine blade (2), wherein the outer surface of said fairing is arranged so as to reduce, when mounted on the blade, the aerodynamic drag in a flapwise (z) direction of the blade. In this way a reduction of the exciter power required in a flatwise fatigue test of the blade is achieved.

14 Claims, 3 Drawing Sheets

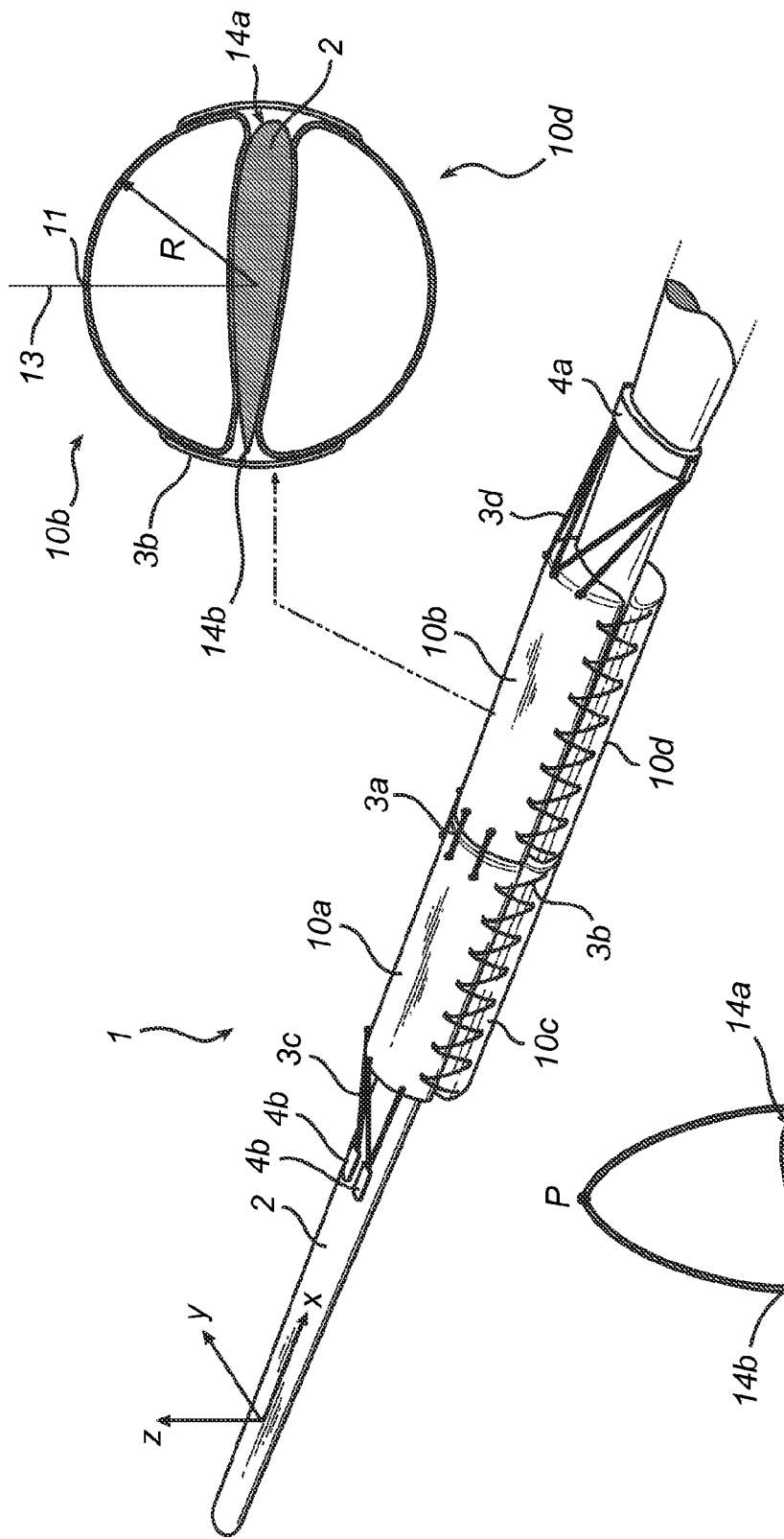

FAIRING FOR WIND TURBINE BLADE

TECHNICAL FIELD

The current invention relates to a fairing for arrangement on a wind turbine blade or rotor blade, and to the use of the fairing at wind turbine blade testing and in particular at wind turbine blade fatigue testing.

BACKGROUND

According to one example a blade fatigue test to a wind turbine blade or a wind turbine rotor blade may comprise the following steps:
- the blade is bolted and/or clamped to a test rig and visually inspected,
- strain gauges are applied to the blade skin and wiring is done,
- an eccentric mass exciter and dead loads are mounted onto the blade to obtain the required cross sectional bending moments, and also to obtain R-ratios close to the required,
- a static calibration test is performed to obtain strain- and stiffness information for the blade in the cross sections equipped with strain gauges; the load level in terms of the bending moment range at the root interface is determined,
- the blade is subject to the required number of load cycles. A frequency converter powers the electric motor exciter mounted on the blade. This forces the blade with all additional masses to oscillate in a flapwise direction at a frequency close to the natural frequency. A control system ensures that the root bending moment range is kept at a constant level during the test,
- at a specified number of load cycles a scan of all strain gauges is performed automatically, to record the strain range at every gauge position, Static calibration tests are performed at regular intervals of, for example, one million cycles to monitor structural changes of the blade.

A common concern related the above described tests is the amount of power consumed during testing. Hence, there is a desire for reducing the energy consumption at wind turbine blade fatigue testing.

SUMMARY OF THE INVENTION

One object of the invention is to overcome or at least alleviate the above described problems. In particular, it is an object of the invention to reduce the energy consumption at wind turbine blade fatigue testing.

One way of achieving this object is by means of a fairing adapted to be mounted on a wind turbine blade, wherein the outer surface of the fairing is arranged so as to reduce, when mounted on the blade, the aerodynamic drag in a flapwise direction of the blade.

FIG. 2a, closer described below, schematically illustrates one example of a fairing which is mounted on an elongated wind turbine blade. In relation to this invention, the term "longitudinal direction" of the blade corresponds to the x-direction as illustrated in FIG. 2a. In other words, it corresponds to the direction of the longest dimension, or the length wise direction of the blade.

The term "chord direction" of the blade corresponds to the y-direction as illustrated in FIG. 2a. In other words, it corresponds to the cross wise direction of the blade. The blade extends in the chord direction from its leading edge to its trailing edge.

The term "flapwise direction" corresponds to the z-direction as illustrated in FIG. 2a, or a direction in parallel with and reversed to that direction. In other words, the flap wise direction corresponds to the direction of motion of the blade during a fatigue test, which motion is orthogonal both to the chord direction and the longitudinal direction of the blade.

The term "direction of motion of the blade" refers to one of the flapwise directions in which the blade is moving or intended to move during the test.

According to another aspect thereof, the invention also relates to the use of a fairing at fatigue testing of wind turbine blades.

Advantageous embodiments of the invention are presented in the attached dependent claims. More details about the above aspects will be given below. What is stated in relation to one of the above aspects normally applies to all of them.

When providing equipment for blade testing it is important that the design of the equipment is such that the equipment does not significantly affect the properties of the blade, which are of interest to measure. These properties include, for example, ultimate strength, fatigue strength, natural frequency of the blade in the flap wise and edge wise direction, and laminate strength.

In essence, the inventor has found a way of reducing the energy consumption at blade testing, without substantially affecting the properties of the blade, which are subject for measurements. This is achieved by providing a fairing, which reduces the air-resistance or the drag of the blade in the flap wise direction of the blade. The lowered air-resistance of the blade is achieved by attaching a fairing to the blade which makes the cross-section of the blade more stream-lined in the flap wise direction, i.e., in the direction the blade is moving during the test, which direction is substantially orthogonal both to the longitudinal direction and the chord direction of the blade.

Lowering the air-resistance or drag of the blade in the flapwise direction is related to several advantages. As already mentioned it reduces the power consumed for performing the flapwise testing, as the force needed for moving the blade is lowered. In other words, the exciter power requirement in flapwise testing is reduced. Further, as the force needed for moving the blade is lowered, the wear of the equipment used for moving the blade is also decreased. Additionally, there is also a reduction in the amount of wind generated around the blade during testing. In other words, if the tests are performed indoors, it will be less windy inside the testing facility during the tests.

The use of a fairing as described in this document may enable the use of a smaller motor in the blade motion inducing equipment, since a reduction of the air resistance of the blade is achieved.

Moreover, according to a preferred embodiment the fairing is inflatable and sealable in an inflated condition. This is advantageous as a deflated fairing is less bulky and therefore easier to store and handle, compared to a rigid one. The inflatable fairing may be arranged of a strong light-weight or heavier material, preferably durable, such as a rubber or PVC coated fabric.

According to one example, the fairing comprises a sealable air inlet, preferably arranged for engaging with a high pressure air nozzle. This is advantageous as it allows the fairing to be filled by means of high pressure air generators available in most testing facilities.

According to one example, the density of the fairing is less than 90% of the blade, or less than 75% of the blade, or less than 60%, or less than 30% of the blade. This is advantageous since the influence by the weight of the fairing on measurements in a blade fatigue test will be limited. Where the fairing is inflatable it will in its inflated condition provide a low density structure.

In relation to this invention, the term "density" refers to the density of the whole fairing including, for example, air-filled cavities. Further it relates to the density of the fairing in use or in a mounted condition, i.e., for an inflatable fairing the term "density" refers to the density of the whole fairing in its inflated state including the gas filled volume. In relation to this invention, the blade density refers to the density of the blade including, for example, air-filled cavities.

According to one example, the fairing is made of light-weight material, such as composite, plastic or structural foam. As the fairing is made of a light-weight material, it does not add any substantial mass to the blade, i.e., it neither significantly increases the energy consumption due to its weight, nor significantly effects the measurement results.

Preferably, the fairing is adapted to cover, at least along a portion of the blade in the longitudinal direction of the blade, the entire blade from the leading edge to the trailing edge of the blade.

Preferably, the fairing is adapted to provide a shape that is more streamlined in the flapwise direction than the blade itself. This can be obtained by the fairing providing a curvature that is, as "experienced" by air passing the fairing, smaller than the curvature of the blade trailing and leading edges.

Preferably the fairing, when mounted on a blade, presents an outer surface which, as seen in a cross-section taken in parallel with the chord direction and the flapwise direction of the blade, is tapered from the blade towards respective ends being distal to the blade. Thereby, the fairing may be rounded, pointed or arc shaped in the flapwise direction.

Moreover, according to one example, the fairing, when mounted on a blade, presents an outer surface which, as seen in a cross-section taken in parallel with the chord direction and the flapwise direction of the blade, is convex.

Moreover, according to one example, at least a portion of the outer surface, as seen in a cross-section taken in parallel with the chord direction and the flapwise direction of the blade, substantially describes at least a portion of a triangle or an arc of an ellipse, arc of a cartenoid, arc of a parabola or arc of a hyperbola. As seen in the cross-section, and referring to a polar coordinate system with a center in the mid-chord location of the blade profile, the portion of the cross-section describing at least a portion of an ellipse, cartenoid, parabola, hyperbola or triangle, may cover at least 70° or 80° of the outer surface, or at least 160° or 170° of said outer surface, or at least 340° or 350° of said outer surface.

According to one example, the fairing preferably reduces the air resistance of the blade by making the outer cross-section of the blade more circular, pointed or arc shaped in a flap-wise direction of the blade.

According to one embodiment, an outer surface of the fairing, as seen in a cross-section taken in parallel with the chord direction and the flapwise direction of the blade, substantially describes at least a portion of an arc of an ellipse, the ellipse being defined by a first semimajor axis and a second semimajor axis, the first axis of the ellipse preferably being arranged substantially in parallel with the chord direction of the blade, and the ratio of the length of the axes is between 0.5 and 1, or between 0.65 and 1 or between 0.8 and 1.

Every ellipse has a major axis and a minor axis, at right angles to each other and passing through the centre of the ellipse. The distance between antipodal points on the ellipse, or pairs of points whose midpoint is at the center of the ellipse, is maximal where the major axis cuts the ellipse and minimal where the minor axis cuts it. The length of the semimajor axis is one half of the length of the major axis, the line segment from the centre, through a focus, and to the edge of the ellipse. Likewise, the semiminor axis is one half the minor axis, the line segment from the centre to a nearest point of the ellipse.

According to one example, the length of the first axis of the ellipse is longer compared to the length of the second axis of the ellipse. In other words, the first axis equals the semimajor axis of the ellipse and the second axis equals the semiminor axis of the ellipse. According to another example, the first and second axes are substantially equal. According to a third example the second axis is longer compared to the first axis.

In relation to this invention, the term "said first axis of said ellipse being arranged substantially in parallel with the chord of the local cross-section of said blade" corresponds to the first axis deviating from the chord with a maximum of 20 degrees, or with a maximum of 10 degrees or a maximum of 5 degrees.

In relation to this invention, the term "the ratio of the length of said axes is 0.5" comprises both that the first axis is twice as long as the second axis, and that the second axis is twice as long as said first axis.

According to one example the length of said first axis is substantially equal to the chord length of the local cross-section of said blade.

In relation to this invention the term "said first axis is substantially equal to the chord length of the local cross-section of said blade" refers to that the length of the axis deviates from the length of the chord by less than 15%, or by less than 10%, or by less than 5%, or by less than 3%.

Preferably, the fairing presents, when mounted on a blade, an outer surface which, as seen in a cross-section taken in parallel with the chord direction and the flapwise direction of the blade, is substantially circular.

According to one example, the fairing has a plane of symmetry, which in use coincides with the longitudinal direction and the chord direction of the blade. According to one example, the fairing has a plane of symmetry, which in use coincides with the chord direction and the flap-wise direction of the blade. According to one example, the fairing has a ratio between the width of the fairing and the height which is between 0.3 to 3.

According to one example, the length of the fairing covers in use at least 10%, or at least 15% of the blade, or at least 20%, or at least 30% of the blade. This is advantageous, as the larger surface of the blade the fairing covers, the more of the air resistance or drag is reduced.

According to one example, the fairing is arranged for being mounted closer to the tip than the root of the blade. A greater reduction of air resistance or drag is achieved the closer to the tip the fairing is arranged on the blade, as it is at the tip portion the movement of the blade is the largest.

Preferably, the fairing comprises at least one fairing portion adapted to be positioned on a pressure side of the blade and at least one fairing portion adapted to be positioned on a suction side of the blade.

According to another embodiment, the width of the fairing corresponds to the tapering of the blade in the longitudinal direction towards the tip of the blade. Further, the ratio of the width of the fairing and the chord length of the blade may be substantially constant, i.e., the deviation is less than 10% along the longitudinal direction of the blade when the fairing is in its mounted condition.

The fairing normally comprises fastening means or fasteners for attaching or fastening the fairing to the blade. The fastening means are preferably arranged such that the fairing is held in a substantially fixed condition during the testing of the blade. In other words, when flapwise testing is performed the fastening means are preferably arranged such that the fairing is held in the same position through the whole movement of the blade.

According to one embodiment, the fairing consists of one unitary part, which in its mounted condition encircles the blade or encircles substantially the whole of the blade. In other words, in the case of an elliptical cross-section, the portion of the arc of the ellipse covers at least 340 degrees of the ellipse, continuously or discontinuously. Preferably, the coverage is at least 350 degrees of the arc, or at least 355 degrees of the arc.

Alternatively, the fairing comprises two portions, each in their mounted condition covering only one side of the blade. In other words, in the case of an elliptical cross-section, the portion of the arc of the ellipse covers at least 160 degrees of the ellipse, continuously or discontinuously. Preferably, the coverage is at least 170 degrees of the arc, or at least 175 degrees of the arc.

According to one example, the fairing comprises 2 self-contained structures, which each covers substantially half of the outer surface of the blade. In their mounted condition the structures preferably encircles substantially the whole cross-section of the blade, i.e., at least 340° or 350° of the cross-section is covered by said fairing.

According to one example, the fairing comprises 4 self-contained structures, which each covers substantially a quarter of the outer surface of the blade. In their mounted condition the structures preferably encircles substantially the whole cross-section of the blade, i.e., at least 340° or 350° of said cross-section is covered by said fairing.

According to one example, the fairing comprises at least a first and a second fairing portion, wherein the first part is arranged for being mounted on a first surface of the blade and preferably covers substantially the whole area thereof, and the other part is arranged for being mounted on a surface of the blade which is opposite to the first surface, and preferably covers substantially the whole area thereof.

Further, at least the first and second fairing portion each comprises fastening means or fasteners for cooperation with threading means, clipping means and/or zipping means such that two of the fairings are attachable to each other by means of tying, clipping and/or zipping, respectively.

The fairing may also be provided with fastening means for cooperation with threading means, clipping means and/or zipping means such that the fairing may be secured to the blade.

A fairing may also be provided with a tongue portion, wherein the fastening means are arranged, in order to facilitate the securing of the fairing.

Further, two fairing portions may each be provided with a tongue portion, wherein the fastening means are arranged, wherein in use the tongue portions extend towards each other.

According to a more detailed example, the fairing is fastened to the blade by means of tying, buttoning, zipping and/or clipping. In other words the fairing may comprise cooperative means or devices for tying, buttoning, zipping and/or clipping the portions to each other.

In more detail, clipping means may comprise devices for buttoning, hooking, grasping and/or clamping two items together.

These and other aspects of the invention will be apparent from, and elucidated with reference to, the embodiments described hereinafter.

BRIEF DESCRIPTION OF THE DRAWINGS

FIG. 2a schematically illustrates a perspective view and a cross-section of one embodiment of the invention.

FIG. 2b schematically illustrates a cross-section of a different embodiment of the invention.

DETAILED DESCRIPTION OF EMBODIMENTS

A streamlined shape is one with a contour that is itself a streamline, or its shape is such that its resistance to the flow of air, water, or another fluid past it is reduced. In other words, in order to streamline a body, the external contours are preferably smoothed out so that a streamlined flow over it is achieved and the flow's resistance to a motion of the body is reduced. This resistance may also be referred to as drag or form drag.

Calculations of the effect of a body's cross-section with respect to air resistance and drag, respectively can be found in aerodynamic reference tables. In general, the less of a body's surface that is oriented in a direction normal to the direction of the airflow, the smaller the air resistance and the drag.

Figure 1A:
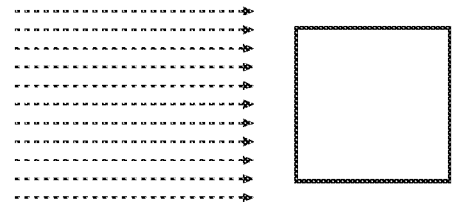
FIG. 1 schematically illustrates different arrangements for measuring wind resistance and drag.
Figure 1B:
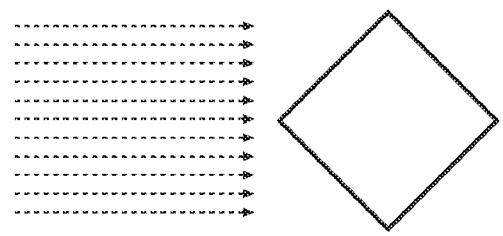
Figure 1C:
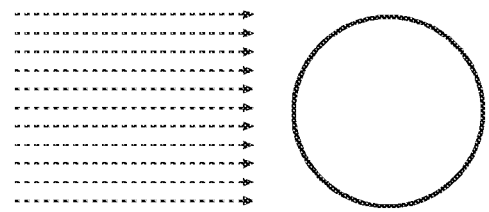

The drag of a body with a constant square cross-section as illustrated in FIG. 1b and arranged in relation to the air flow as indicated in FIG. 1b, is lower than that of a body with a constant square cross-section as illustrated in FIG. 1a and arranged in relation to the air flow as indicated in FIG. 1a, if the length of a diagonal of the cross-section of the body in FIG. 1b is equal to the length of a side of the cross-section of the body in FIG. 1a. Further, a body with a constant circular cross-section as illustrated in FIG. 1c and arranged in relation to the air flow as indicated in FIG. 1c, has a lower drag compared to the body in FIG. 1b, if the diameter of the cross-section of the body in FIG. 1c is equal to the length of a diagonal of the cross-section of the body in FIG. 1b.

When designing the shape of the outer surface of a fairing for a wind turbine blade to be exposed to a fatigue test, one should keep in mind that the blade will normally be moved in two directions. So the drag and air resistance should preferably be lowered in both flapwise directions or both directions of blade movement. In other words, conventional stream line shapes, usually non-symmetrical, designed for movement in only one direction, might not be ideal in this case of movement in two directions. According to one example, the object presented above is achieved by fairings which have a plane of symmetry in parallel with both the chord and longitudinal direction of the blade. However, there are fairings lacking the described plane of symmetry which also lowers the air resistance of the blade. One example is presented by a fairing which has an outer cross-section corresponding substantially to half an ellipse on one side of the blade, and an outer cross-section being substantially triangular or wedge shaped on the other side of the blade.

The term "fluid facing surface" of a fairing, refers to the portion of a fairing which is in contact with the fluid as the fairing moves in relation to the fluid. For the fairing illustrated in FIG. 2b, the fluid facing surface corresponds to the surface extending from E1 to P and further to E2, as well as the surface extending from E2 to P2 and further to E1. The surfaces extending between E1 and E2 are not referred to as fluid facing surfaces, as these in use are facing, for example, the blade and/or another fairing in stead of the surrounding fluid.

The width of the fairing, i.e., its extension in the chord direction of the blade, may vary along the longitudinal direction of the blade.

As seen in FIG. 2a the fairing consists of four fairing portions, 10a, 10b, 10c, 10d which are arranged around the blade. When the blade is arranged such that the flap wise direction coincides with the vertical direction, two of the fairing portions 10a, 10b are mounted adjacent to each other on top of the blade, on a suction side thereof, and two fairing portions 10c, 10d are mounted adjacent to each other underneath the blade, on a pressure side thereof. The fairing portions are fastened to each other and to the blade by means of fixation means 3a, 3b, 3c, 3d. As can be seen in the FIG. 2a the fairings are fastened to each other by means of tying, i.e., each fairing portion 10a, 10b, 10c, 10d comprises receiving means which can engage with tying means. In more detail, each fairing portion 10a, 10b, 10c, 10d is provided with holes, preferably reinforced holes, for cooperation with, for example, rope or a cable.

According to one example, a first pair of fairing portions is arranged on a 50 m blade, such that is covers a surface portion between 34-37 m from the root of the blade, one fairing portion on each side of the blade. Further, another pair of fairing portions is arranged such that it covers a surface portion between 37-40 m from the root of the blade, one fairing portion on each side of the blade.

Alternatively, the fastening means 3a-3d may comprise clipping means fastened to one of the fairing portions, whereas another fairing portion comprises receiving means for interacting with the clipping means. For instance, at least two strings are provided and mounted on two different fairing portions, and each string is arranged with a clip. The pair of clips are brought to lockingly engage with each other before at least one of the strings is tightened. Moreover, the fastening means may also include zipping means or buttoning means, such as items which are locked together by means of a zipping action or buttoning action, respectively.

In other words, each fairing portion may comprise fastening means for fastening the fairing portion to another fairing portion arranged on the same side of the blade, and/or for fastening the fairing portion to another fairing portion on the opposite side of the blade. These fastening means may comprise receiving means for cooperation with threading means, as seen in FIG. 2a, as well as for cooperation with clipping means or zipping means.

According to one example, a fairing portion is provided with a tongue portion which in use is directed towards a fairing portion arranged on the opposite side of the blade. Further, the tongue portion comprises fastening means such as to facilitate the fastening of one fairing portion to another. Further, the tongue portion may be arranged on only one of two opposite fairing portions or on both of them.

Further, the fairing portions may be secured to the blades by fastening means attachable to the blades, such as web loop tie off panels. In other words, the fairing portions can comprise receiving means for cooperation with threading means (e.g. ropes or cables) which are tied to fastening means present on the blade, such as weights 4a or specially designed fastening means 4b which have been secured to the blade by means of, for example, bonding. Preferably, at least one of the fastening means 4a is arranged towards the root end side of the blade, and at least one is arranged towards the tip end side of the blade 4b.

According to one example, the fastening means or tags or tie off panels are made of reinforced rubberised fabric and is, for example, about 500 mm long and 150 mm wide. It is bonded onto the blade surface in parallel with the blade axis using contact adhesive, for example, in 3 positions 4-5 m rootwards from the end of the fairing. The fairing is then tied off with, for example, polyester rope to strong loops on the tags to prevent movement towards the tip. Preferably, the fairing portions are provided with reinforced eyes which can accept the forces induced from these tie off ropes during testing.

FIG. 2a also illustrates a cross-section of two of the fairing portions 10b, 10d, which cross-section is taken in a direction in parallel with both the chord direction and flapwise direction of the blade. The two fairing portions 10b, 10d are arranged symmetrically around the blade, i.e., there is a plane of symmetry in parallel with both the longitudinal direction and the chord direction of the blade. Moreover, according to this example the outer cross-section of the fairing portions is substantially circular. Each fairing portion describes an arc of a circle, and the arc covers at least 150 degrees of the circle. Further, the cross-section of the fairing is substantially constant over a major or greatest part of the fairing or over substantially the whole of the fairing.

According to one embodiment, the width of the fairing, i.e., its extension in the chord direction of the blade, is substantially constant along the longitudinal direction of the blade.

According to another embodiment, the width of the fairing corresponds to the tapering of the blade in the longitudinal direction towards the tip of the blade. Further, the ratio of the width of the fairing and the chord length of the blade may be substantially constant, i.e., the deviation is less than 10% along the longitudinal direction of the blade when the fairing is in its mounted condition.

Further, the cross-section of the fairing is tapered towards the top P of the fairing. The top is the point of the fairing 11 which in use is arranged furthest away from the blade in a flapwise direction. In other words, the distance from a point 12 on the outer surface of the fairing along the chord direction to a line 13, extending in parallel with the flapwise direction from the blade to the top of the fairing, is constant or decreasing as measured in a direction from the blade towards the top.

As can be seen in the Figure, the respective outer surface of the cross-sections is convex, the respective fairing does not cover the edge portions 14a, 14b of the blade, and the fairings 10b, 10d are fasten to each other by means of cables or ropes 3b. Further, the height of the faring, i.e., the distance from the blade to the top P along a direction parallel to the flapwise direction is substantially constant, i.e. varying by less than 10%, along a longitudinal direction of the blade. According to another example, the height of the fairing is constantly decreasing towards the tip of the blade. Further, according to one example, the ratio between the height of the fairing and the chord length of the blade may be substantially constant along a longitudinal direction of the blade.

A cross-section of an alternative arrangement of a pair of fairings is seen in FIG. 2b. These fairings are similar to the ones described in relation to FIG. 2a. The outer cross-section of the fairing is tapered towards the top P of the fairing, when measured from the blade towards the top. Further, the cross-section of the respective fairing is convex. The cross-section is taken in a direction in parallel with both the chord direction and flapwise direction of the blade.

However, the fairing portions illustrated in FIG. 2b differ from those illustrated in FIG. 2a in that the fairing portions cover the edges 14a, 14b of the blade and in that the width of each respective fairing portion is slightly larger than the chord length of the blade. According to an alternative embodiment, the two fairing portions are spaced apart at the edges of the blade 14a and 14b, as illustrated in FIG. 2a. Moreover, the width of the respective fairing portion can substantially correspond to the length of the blade in the chord direction. The fairing portions are attached to each other by means of clips or zippers.

According to one example the fairing portions are made of a foam material, such as a structural foam with a density of 50-75 kg/m$^3$.

According to an alternative embodiment, the fairing or fairing portions are inflatable, and, for example, made of a rubber material.

According to one example, the following steps are performed for fastening a pair of fairing portions to the blade:

the surface is inspected at the area where the fairing portions are to be mounted, and any sharp objects are preferably removed or covered;

any sensor or strain gauge wire, that will be inaccessible once the fairing is mounted, is fixed;

two web loop tie off panels 4b are bonded to the blade, e.g. 3-5 m from the respective end of the fairing using PVC adhesive;

two fairing portions are joined edge to edge, by zig zag lacing or cable ties;

the fairing portions are placed in position, and if inflatable they are preferably mounted in their deflated state;

the edges of the fairing portions are laced together;

for inflatable fairing portions: alternately inflate the fairing portions to achieve the desired shape, adjust if necessary so that ties are approximately symmetric about the blade;

the fairing portions are tied to the web loop panels 4b, the lines are tensioned against each other to e.g. 5-10 kg preload.

Figure 3:
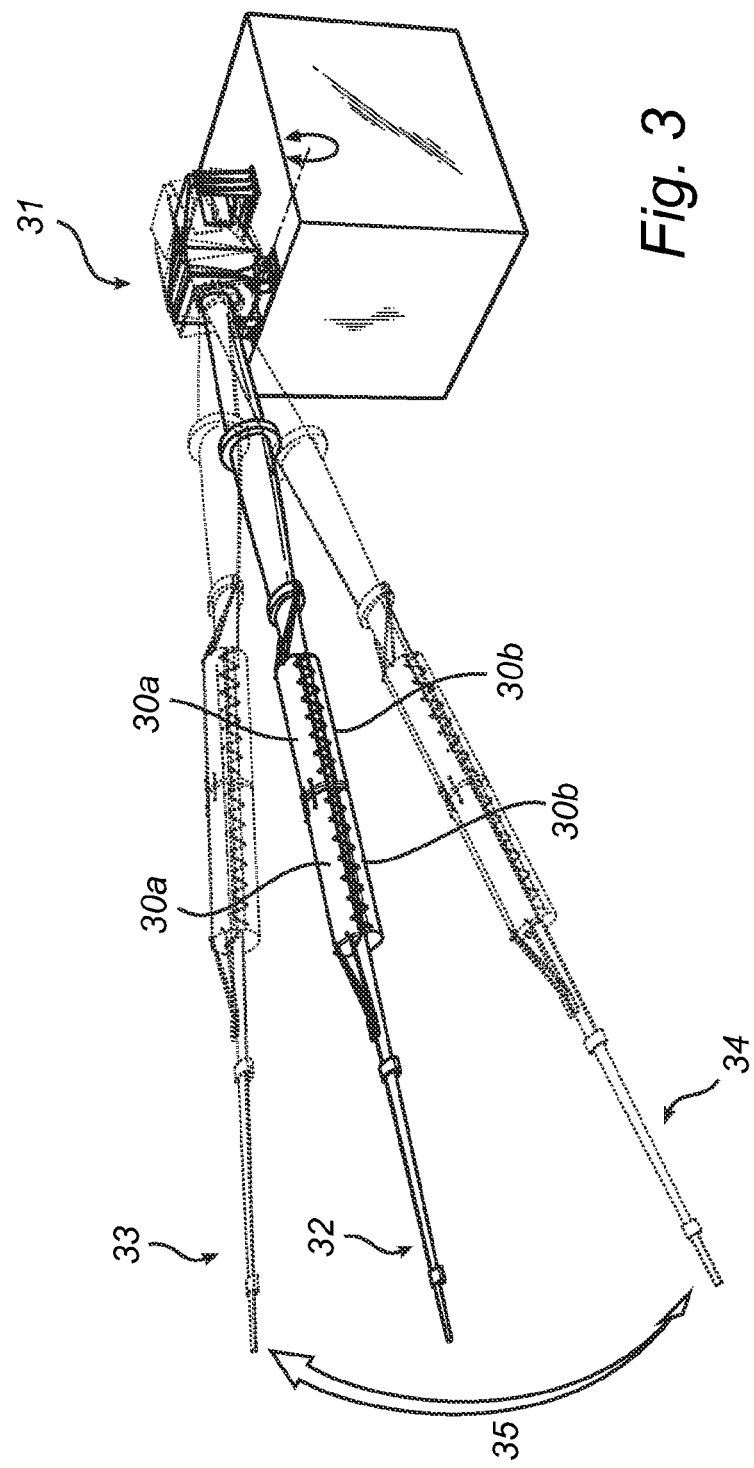
FIG. 3 schematically illustrate one example of a blade fatigue testing device.

FIG. 3 illustrates a blade with mounted fairings in use at a fatigue test. During the test the blade is moved in its flapwise directions 35. The movement is effectuated by a fatigue operator 31. Normally, the blade is deformed or bent as it moves back and forth during the testing; this has not been illustrated in the drawing.

Further, for a fairing which is mounted on both sides of the blade, there is a leading and a trailing surface. According to this embodiment, the blade is mounted having a substantially horizontal first orientation 32, and is moved upwards to a second location 33 and downwards to a third location 34. As the blade is move upwards from the third to the second location, the leading outer surface 30a of the fairing is arranged on top of the blade, and the trailing outer surface 30b is arranged beneath the blade.

As the direction of motion of the blade is reversed, so are the leading and trailing outer surfaces of the blade. As the blade is moved downwards from the second to the third location, the leading outer surface 30b of the fairing is arranged beneath the blade, and the trailing outer surface 30a is arranged on top of the blade.

In other words, the leading surface of the fairing is the surface which is arranged in the direction of motion of the blade.

According to an alternative embodiment, instead of being arranged at substantially the middle of the blade as illustrated if FIG. 3a, the fairings are arranged further towards the tip of the blade. This is advantageous as the movement of the blade is largest at the tip. Preferably, the fairing is arranged at a quarter of the blade being closest to the tip.

In general, the fairing may be arranged such that it covers the tip of blade. However, it might be easier to design and securely fasten the fairing if it does not cover the tip, so the tip may be left uncovered. As the tip is small, a covering of the tip may be of less importance when the total effect of different fairings is evaluated.

A person skilled in the art will, given the above teaching and description, be able to design a suitable fairing for any type of blade. He also realizes that the present invention by no means is limited to the preferred embodiments described above. On the contrary, many modifications and variations are possible within the scope of the appended claims. For example, in relation to the Figures a fairing comprising four fairing portions have been described. However, the skilled man readily understands that the fairing may consist of any number of fairing portions. The fairing may be just one self-contained unit, or a set of two, three, or four fairing portions etc. Further, the number of fairings arranged on one side of the blade, may be different from the number of fairings arranged on the opposite side of the blade.

In the claims, the word "comprising" does not exclude other elements or steps, and the indefinite article "a" or "an" does not exclude a plurality. A single unit may fulfil the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A fairing adapted to be mounted on a wind turbine blade during fatigue testing of the blade but otherwise adapted to form no part of a wind turbine blade during operation of a wind turbine, wherein the outer surface of said fairing is arranged so as to reduce, when mounted on the blade during fatigue testing, the aerodynamic drag in a flapwise (z) direction of the blade.

2. The fairing according to claim 1, wherein said fairing is inflatable and sealable in an inflated state.

3. The fairing according to claim 2, wherein said fairing comprises a sealable air inlet arranged for engaging with a high pressure air nozzle.

4. The fairing according to claim 1, wherein the density of said fairing is less than 90% of the density of the blade.

5. The fairing according to claim 1, adapted to cover, at least along a portion of the blade in the longitudinal direction of the blade, the entire blade from the leading edge to the trailing edge of the blade.

6. The fairing according to claim 1, adapted to provide a shape that is more streamlined in the flapwise direction than the blade itself.

7. The fairing according to claim 1, which, when mounted on a blade, presents an outer surface which, as seen in a cross-section taken in parallel with the chord direction (y) and the flapwise direction (z) of the blade, is tapered from the blade towards respective ends (P, P2) being distal to the blade.

8. The fairing according to claim 1, which, when mounted on a blade, presents an outer surface which, as seen in a cross-section taken in parallel with the chord direction and the flapwise direction (z) of the blade, is convex.

9. The fairing according to claim 7, wherein at least a portion of said outer surface, as seen in a cross-section taken in parallel with the chord direction and the flapwise direction (z) of the blade, substantially describes at least a portion of an ellipse, cartenoid, parabola, hyperbola or triangle.

10. The fairing according to claim 1, which, when mounted on a blade, presents an outer surface which, as seen in a cross-section taken in parallel with the chord direction (y) and the flapwise direction (z) of the blade, is substantially circular.

11. The fairing according to claim 1, wherein the length of said fairing in use covers at least 10% of the length of the blade.

12. The fairing according to claim 1, comprising at least one fairing portion adapted to be positioned on a pressure side of the blade and at least one fairing portion adapted to be positioned on a suction side of the blade.

13. The fairing according to claim 1, wherein the density of said fairing is less than 80% of the density of the blade.

14. The fairing according to claim 1, wherein the density of said fairing is less than 70% of the density of the blade.

* * * * *